US012313047B2

(12) United States Patent
Nathan

(10) Patent No.: US 12,313,047 B2
(45) Date of Patent: May 27, 2025

(54) PISTON PUMP FOR A HIGH PRESSURE CLEANING DEVICE

(71) Applicant: Alfred Kärcher SE & Co. KG, Winnenden (DE)

(72) Inventor: Robert Nathan, Winnenden (DE)

(73) Assignee: Alfred Kärcher SE & Co. KG, Winnenden (DE)

( * ) Notice: Subject to any disclaimer, the term of this patent is extended or adjusted under 35 U.S.C. 154(b) by 189 days.

(21) Appl. No.: 18/326,349

(22) Filed: May 31, 2023

(65) Prior Publication Data

US 2023/0304480 A1 Sep. 28, 2023

Related U.S. Application Data

(63) Continuation of application No. PCT/EP2021/076241, filed on Sep. 23, 2021.

(30) Foreign Application Priority Data

Dec. 1, 2020 (DE) ..................... 10 2020 131 798.0

(51) Int. Cl.

*F04B 1/0452* (2020.01)
*B08B 3/02* (2006.01)
*F04B 53/22* (2006.01)

(52) U.S. Cl.

CPC .............. *F04B 1/0452* (2013.01); *B08B 3/02* (2013.01); *F04B 53/22* (2013.01)

(58) Field of Classification Search

CPC .... F04B 1/0421; F04B 1/0452; F04B 1/1087; F04B 1/1095; F04B 53/16; F04B 53/22
See application file for complete search history.

(56) References Cited

U.S. PATENT DOCUMENTS 3,958,901 A 5/1976 Drevet
4,294,281 A 10/1981 Gerdes
5,299,921 A 4/1994 Richter
5,823,169 A 10/1998 Strohl et al.
(Continued)

FOREIGN PATENT DOCUMENTS

CN 102953974 3/2013
DE 69 48 188 U 4/1970
(Continued)

*Primary Examiner* — Kenneth J Hansen
(74) *Attorney, Agent, or Firm* — Womble Bond Dickinson (US) LLP

(57) ABSTRACT

A piston pump for a high-pressure cleaning device is provided, having a pump housing, which includes a first housing part and a second housing part. The first housing part forms a suction conduit and a pressure conduit, and the second housing part forms a plurality of pump chambers into each of which a reciprocally movable piston dips and which are each in flow connection with the suction conduit by way of an inlet channel and with the pressure conduit by way of an outlet channel. The inlet channel can be closed by an inlet valve and the outlet channel can be closed by an outlet valve. The second housing part includes a valve receptacle, and that the piston pump includes an outlet valve assembly, wherein the outlet valve assembly comprises an outlet part, which is inserted into the valve receptacle and forms all outlet valve seats.

32 Claims, 9 Drawing Sheets

(56) References Cited

U.S. PATENT DOCUMENTS

| | | | | |
|---|---|---|---|---|
| 7,341,435 | B2 | 3/2008 | Vicars | |
| 2010/0232994 | A1 | 9/2010 | Schumann et al. | |
| 2014/0328701 | A1 * | 11/2014 | Nathan | F04B 53/164 417/269 |
| 2015/0219096 | A1 | 8/2015 | Jain et al. | |

FOREIGN PATENT DOCUMENTS

| | | |
|---|---|---|
| DE | 1 939 242 | 7/1970 |
| DE | 2 352 217 | 5/1974 |
| DE | 43 38 896 | 3/1997 |
| DE | 198 01 146 | 6/1999 |
| DE | 202 11 512 | 11/2002 |
| DE | 10 2005 050 009 | 4/2007 |
| DE | 10 2009 006 042 | 7/2010 |
| DE | 10 2009 049 095 | 4/2011 |
| DE | 10 2007 003 521 B4 | 6/2011 |
| DE | 10 2012 015 504 | 2/2014 |
| DE | 10 2013 225 222 | 6/2015 |
| DE | 10 2014 222 480 | 5/2016 |
| DE | 10 2019 200 784 | 7/2020 |
| EP | 1 605 160 | 12/2005 |
| EP | 2 519 744 | 7/2013 |
| EP | 2 817 516 | 12/2014 |
| EP | 2 805 055 | 5/2016 |
| EP | 2 805 050 | 7/2016 |
| EP | 3 645 885 | 6/2021 |
| FR | 1 344 108 | 11/1963 |
| GB | 588 612 | 5/1947 |
| GB | 1 307 866 | 2/1973 |
| RU | 2 676 974 C1 | 1/2019 |
| WO | WO 2008/086950 | 7/2008 |
| WO | WO 2013/107520 | 7/2013 |
| WO | WO 2013/123969 | 8/2013 |
| WO | WO 2016/037893 | 3/2016 |
| WO | WO 2019/169365 | 9/2019 |

* cited by examiner

PISTON PUMP FOR A HIGH PRESSURE CLEANING DEVICE

CROSS REFERENCE TO RELATED APPLICATIONS

This application is a continuation of international application number PCT/EP2021/076241, filed on Sep. 23, 2021, and claims the benefit of German application number 10 2020 131 798.0, filed on Dec. 1, 2020, which are incorporated herein by reference in their entirety and for all purposes.

BACKGROUND OF THE INVENTION

The invention relates to a piston pump for a high pressure cleaning device for conveying a cleaning liquid, with a pump housing, which comprises a first housing part and a second housing part that are each configured as a metal part, wherein the first housing part forms a suction conduit and a pressure conduit, and wherein the second housing part forms a plurality of pump chambers into each of which a reciprocally movable piston dips and which are each in flow connection with the suction conduit by way of an inlet channel and with the pressure conduit by way of an outlet channel, wherein the inlet channels are each closable by an inlet valve and the outlet channels are each closable by an outlet valve, wherein the outlet valves each comprise a stationarily held outlet valve seat and an outlet closing body that is reciprocally displaceable relative to the outlet valve seat and that comprises an outlet valve plate that can sealingly abut against the outlet valve seat.

Piston pumps of that kind are known from DE 10 2009 049 095 A1. They can be used to pressurize a cleaning liquid, for example water, supplied via the suction conduit and to discharge it via the pressure conduit. For example, a pressure hose can be connected to the pressure conduit, which bears a nozzle head at its free end, by way of which the pressurized cleaning liquid can be directed at an object. The piston pump is driven by a drive motor, which is coupled to the pistons of the piston pump, for example, by way of a swash plate transmission and drives them to a reciprocating stroke movement. The reciprocating movement of the respective pistons dipping into a pump chamber results in a periodic increase and decrease of the volume of the pump chambers, such that cleaning liquid is sucked into the pump chambers via the inlet channels and is discharged under pressure via the outlet channels. The pressure may be at least 80 bar, for example. In order to be able to withstand the pressure load, the pump housing comprises a first and a second housing part, each of which are configured as a metal part. The first housing part forms the suction conduit and the pressure conduit, and the second housing part forms the pump chambers as well as the inlet and outlet channels, by way of which the pump chambers are in flow connection with the suction conduit and the pressure conduit.

The inlet channels can each be closed by a respective inlet valve and the outlet channels can each be closed by a respective outlet valve. In DE 10 2009 049 095 A1, outlet valves are proposed, each having an outlet part and an outlet closing body that is reciprocally displaceable relative thereto. The outlet part forms and outlet valve seat and the outlet closing body comprises an outlet valve plate that is able to sealingly abut against the outlet valve seat. Each outlet part is stationarily held in an outlet channel. Typically, the outlet part is made of stainless steel and pressed into an outlet channel or held therein in a rotationally-fixed and axially non-displaceable manner by crimping.

Piston pumps for high pressure cleaning devices are known from WO 2008/086950 A1 and EP 2 805 050 B1, in which the two housing parts of the pump housing are made of a plastic material. This makes it possible to form the outlet valve seats directly in a housing part without an additional outlet part being necessary. However, pump housings made of a plastic material have a lower compressive strength than pump housings formed by metal parts.

In accordance with an embodiment of the invention, a piston pump of the kind stated at the outset is further developed in such a way that it can be produced more cost-effectively.

SUMMARY OF THE INVENTION

In accordance with an embodiment of the invention, a piston pump of the generic type is provided in which the second housing part comprises a valve receptacle into which all outlet channels open, and in that the piston pump comprises an outlet valve assembly that forms all outlet valves, wherein the outlet valve assembly comprises an outlet part, which consists of a plastic material and is inserted into the valve receptacle and forms all outlet valve seats.

The piston pump in accordance with the invention comprises an outlet valve assembly, which forms all outlet valves. The outlet valve assembly comprises an outlet part, which is inserted into a valve receptacle. The valve receptacle is formed by the second housing part configured as a metal part. The outlet part consists of a plastic material and comprises all outlet valve seats. The outlet valve seats of the piston pump are thus provided by the outlet part. It is therefore not necessary to fix a separate outlet part, which forms an outlet valve seat, for each outlet valve in an outlet channel. A complex post-processing of the second housing part configured as a metal part can also be omitted. A single outlet part is used, which comprises all the outlet valve seats of the piston pump in accordance with the invention and is made of a plastic material. This reduces the manufacturing costs of the piston pump and facilitates the assembly thereof.

The first housing part and/or the second housing part is preferably configured as a die-cast part or as a reshaped part.

Preferably, the first housing part and/or the second housing part is made of an aluminum or brass material.

Preferably, the valve receptacle is arranged on the side of the second housing part pointing toward the first housing part.

The outlet valve assembly is favorably configured as a unit that can be preassembled. This allows the outlet valve assembly to be assembled as a standalone unit before the complete piston pump is assembled. The outlet valve assembly can be assembled at a first location and then be transported to a second location where the assembly of the complete piston pump takes place.

Preferably, the outlet part comprises a plurality of annular outlet valve seat bodies, each forming an outlet valve seat.

Preferably, the outlet valve seat is oriented flush with an outlet channel.

In a preferred embodiment of the invention, the second housing part in the region of the valve receptacle forms a plurality of annular outlet support surfaces, which are oriented perpendicularly to a longitudinal axis of the valve receptacle and each adjoin an outlet channel in the flow direction of the cleaning liquid and against each of which a respective outlet valve seat body abuts with the interposition of a sealing ring. The perpendicular orientation of the outlet support surfaces makes it possible to configure the sealing rings abutting against the outlet support surfaces as axial seals, such that striations oriented in parallel to the longitudinal axis of the valve receptacle that may arise in the region of the valve receptacle during production of the second housing part do not impair the sealing effect of the sealing rings. Such striations can arise, in particular, when the second housing part is configured as a die-cast part, during the production of which a demolding takes place. Any striations that arise during the demolding in the region of the valve receptacle extend in the demolding direction, that is, they extend in parallel to the longitudinal axis of the valve receptacle, but not in parallel to the outlet support surfaces, as these are aligned perpendicularly to the longitudinal axis of the valve receptacle. Thus, any striations that arise in the region of the valve receptacle during demolding of the second housing part cannot impair the seal acting in the axial direction.

Preferably, the outlet support surfaces each adjoin an outlet channel in the flow direction of the cleaning liquid.

As already mentioned, the outlet valve assembly forms all outlet valves of the piston pump. It is favorable if the outlet valves each comprise an outlet closing body, which is reciprocally displaceable relative to the outlet part and which comprises an outlet valve plate that can sealingly abut against an outlet valve seat and comprises an outlet valve stem adjoining the outlet valve plate in the direction pointing away from the outlet channel. The outlet valve stem is arranged downstream of the outlet valve seat relative to the flow direction of the cleaning liquid.

The outlet valve assembly preferably comprises a guide body, which consists of a plastic material and comprises a plurality of guide elements on each of which a respective outlet valve stem is displaceably mounted. In an embodiment of that kind, all outlet valve stems are guided by means of the guide body. This results in a further simplification of the assembly of the piston pump.

The guide elements are set up to each guide an outlet valve stem of an outlet closing body.

In a preferred embodiment of the invention, the guide elements each form a guide receptacle into which an outlet valve stem dips.

It is favorable if the guide receptacles each comprise at least one inner groove extending in the longitudinal direction of the guide receptacle. Cleaning fluid can escape from the respective guide receptacle via the inner groove.

A respective outlet valve spring is favorably clamped in each case between the guide elements and the outlet valve plates. By means of the outlet valve spring, the outlet valve plate can be biased in the direction toward the associated outlet valve seat.

In an advantageous embodiment of the invention, the guide body is connectable to the outlet part in a releasable and liquid-tight manner. This makes it possible in a particularly simple manner to configure the outlet valve assembly as a unit that can be preassembled. For this purpose, in a first assembly step, the outlet valve stems can each be inserted into a respective guide receptacle of the guide body, wherein the outlet valve stems in their region protruding out of the guide receptacles are surrounded by an outlet valve spring, which are supported on a guide receptacle on the one hand and on an outlet valve plate on the other hand. The guide body can then be connected to the outlet part in a liquid-tight manner, preferably with the interposition of a sealing ring. In a subsequent assembly step, the outlet part connected to the guide body can be inserted into the valve receptacle of the second housing part. The two housing parts of the pump housing can then be joined together.

Preferably, the guide body is pluggably connectable to the outlet part with the interposition of one or more sealing rings.

For example, provision may be made that the guide body is pluggable into the outlet part with the interposition of at least one sealing ring.

It is particularly advantageous if the guide body forms a check valve seat for a central check valve arranged downstream of the outlet valves. In such a configuration, the outlet part forms the valve seats of the outlet valves and the guide body forms the valve seat of the central check valve. This results in a further simplification of the assembly of the piston pump. A check valve closing body can hereby adopt a position directly downstream of the check valve seat formed by the guide body and can be biased by a check valve spring in the direction toward the check valve seat.

The central check valve is preferably arranged in the pressure conduit.

Provision may be made that the first housing part comprises on its side pointing toward the second housing part a housing recess, which is oriented flush with the valve receptacle of the second housing part and into which the guide body dips with the interposition of at least one sealing ring. In such an embodiment, the outlet valve assembly adopts a position between the first housing part and the second housing part, wherein the first housing part comprises on its side pointing toward the second housing part a housing recess into which the guide body dips, and wherein the second housing part comprises on its side pointing toward the first housing part a valve receptacle oriented flush with the housing recess, into which the outlet part is inserted. The guide body is connected to the first housing part in a liquid-tight manner and the outlet part is connected to the second housing part in a liquid-tight manner and, in addition, the guide body and the outlet part are connected to one another in a liquid-tight manner.

The pressure conduit advantageously adjoins the outlet valve assembly in the flow direction of the cleaning liquid.

It is favorable if the at least one sealing ring, which is arranged between the guide body and the housing recess of the first housing part, surrounds the guide body in the circumferential direction.

It is of particular advantage if the guide body comprises an outwardly protruding annular projection, with which a radially inwardly directed step of the housing recess relative to the longitudinal axis of the housing recess is associated, wherein a sealing ring is arranged between the annular projection and the step. The sealing ring can form an axial seal, so that striations, which may arise in the region of the housing recess during the production of the first housing part and are oriented in parallel to the longitudinal axis of the housing recess, do not impair the sealing effect of the sealing ring. Such striations can arise, in particular, when the first housing part is configured as a die-cast part, during the production of which a demolding takes place. Any striations that arise during the demolding in the region of the housing recess extend in the demolding direction, that is, they extend in parallel to the longitudinal axis of the housing recess, but not in parallel to the radially inwardly directed step. Thus, any striations that arise in the region of the housing recess during demolding of the first housing part cannot impair the seal acting in the axial direction.

A further reduction in the production costs of the piston pump in accordance with the invention is achieved in an advantageous embodiment in that the inlet valves each have an inlet part inserted into an inlet channel and an inlet closing body reciprocally displaceable relative to the inlet part, wherein the inlet part comprises an inlet valve seat and a guide member arranged offset from the inlet valve seat, and wherein the inlet closing body comprises an inlet valve plate that can sealingly abut against the inlet valve seat and an inlet valve stem that adjoins the inlet valve plate and is displaceably mounted on the guide member, wherein the inlet part consists of a plastic material and comprises an annular inlet valve seat body, which points toward the pump chamber and forms the inlet valve seat, and wherein the guide member is arranged upstream of the inlet valve seat relative to the flow direction of the cleaning liquid.

In such a configuration of the piston pump, the second housing part forms inlet channels into each of which a respective inlet part made of a plastic material is inserted. The inlet part comprises an annular inlet valve seat body, which points toward the associated pump chamber and forms the inlet valve seat. Upstream of the inlet valve seat body relative to the flow direction of the cleaning liquid, that is, offset from the inlet valve seat body in the direction of the suction conduit, the inlet part forms a guide member, on which the inlet closing body is displaceably mounted. The inlet part made of plastic makes it possible in a cost-effective manner to provide an inlet valve seat without the need for complex post-processing of the second housing part. Because the inlet part is made of plastic, its manufacturing costs are relatively low. The inlet part can be inserted from the side of the inlet channel pointing toward the associated pump chamber into the inlet channel, such that the guide member formed by the inlet part adopts a position upstream of the inlet valve seat and thus outside of the pump chamber. This makes it possible to keep the volume of the pump chamber that cannot be displaced by the piston when moving in the direction of the inlet valve, i.e. the so-called dead space, to a minimum. This improves the suction characteristics of the piston pump.

It is favorable if the inlet valve seat body protrudes out of the inlet channel in the direction of the pump chamber.

It is advantageous if the second housing part forms an annular inlet support surface, which adjoins the inlet channel in the direction of the pump chamber and is oriented perpendicularly to the longitudinal axis of the inlet channel and against which the inlet valve seat body abuts with an abutment surface. In a configuration of that kind, the inlet valve seat body is supported by the inlet support surface of the second housing part.

Preferably, the inlet valve seat body comprises a sealing ring receptacle, which adjoins the abutment surface and in which a sealing ring that seals off the inlet valve seat body relative to the inlet support surface in the axial direction is arranged. Relative to the longitudinal axis of the inlet channel, the sealing ring arranged between the inlet valve seat body and the inlet support surface forms a seal acting in the axial direction. This has the advantage that any striations that are oriented in parallel to the longitudinal axis of the inlet channel and may arise during the production of the second housing part configured as a metal part do not impair the sealing effect of the sealing ring. Such striations can arise, in particular, when the second housing part is configured as a die-cast part, during the production of which a demolding takes place. Any striations that arise during the demolding extend in the demolding direction, that is, they extend in parallel to the longitudinal axis of the inlet channel, but not in parallel to the inlet support surface, as this is oriented perpendicularly to the longitudinal axis of the inlet channel. Thus, striations that arise during demolding of the second housing part cannot impair the seal acting in the axial direction.

In an advantageous embodiment of the piston pump in accordance with the invention, the sealing ring receptacle forms an annular groove surrounding the inlet valve seat body in the circumferential direction, with a first groove wall adjoining the abutment surface, over which the outer diameter of the inlet valve seat body continuously decreases with increasing distance from the abutment surface and which is adjoined by a second groove wall.

The sealing ring receptacle is preferably configured in the manner of a circumferential groove into which a sealing ring can be inserted. This reduces the risk of the sealing ring unintentionally releasing from the sealing ring receptacle when the inlet part is inserted into the inlet channel.

The first groove wall can be configured, for example, in the manner of a cone, wherein the cone angle is preferably about 10° to 30°, preferably about 15° to 25°, in particular 20°.

It is advantageous if the outer diameter of the inlet valve seat body continuously increases over the second groove wall with increasing distance from the abutment surface.

The inlet part is favorably held so as to be rotationally fixed and axially non-displaceable relative to the inlet channel.

Provision may be made, for example, that the inlet part is latchable to the second housing part.

In a preferred embodiment of the invention, the inlet part comprises at least one holding arm, which adjoins the inlet valve seat body in the direction of the suction conduit and is held in a rotationally-fixed manner relative to the inlet channel. In such an embodiment, the inlet part comprises at least one holding arm upstream of the inlet valve seat body. Using of the holding arm, the inlet part can be fixed to the inlet channel in a simple manner. The at least one holding arm hereby dips into the inlet channel.

The at least one holding arm preferably passes through the inlet channel.

It is particularly advantageous if the at least one holding arm engages behind the inlet channel on its side facing toward the suction conduit. This can ensure that the inlet part, after being inserted into the inlet channel from the side pointing toward the associated pump chamber so far that the at least one holding arm engages behind the inlet channel on the side pointing away from the pump chamber, can then no longer easily be removed from the inlet channel.

In a preferred embodiment of the invention, the at least one holding arm is materially bonded to the inlet valve seat body. In such an embodiment, the at least one first holding arm together with the inlet valve seat body forms a one-piece plastic molded part.

Preferably, the inlet part comprises two diametrically opposed holding arms with respect to the longitudinal axis of the inlet channel. The two holding arms enable a mirror-symmetrical and thus highly resilient configuration of the inlet part.

As already mentioned, the inlet closing body comprises an inlet valve stem, which is displaceably mounted on a guide member of the inlet part. It is advantageous if the guide member is fixed to the at least one holding arm.

Preferably, the guide member is materially bonded to the at least one holding arm. In such an embodiment, the guide member together with the at least one holding arm and preferably together with the inlet valve seat body forms a one-piece plastic molded part.

It is favorable if the at least one holding arm comprises an end portion, which points away from the inlet valve seat body and dips into a recess of the second housing part.

In particular, provision may be made that the end portion of the at least one holding arm forms a positive engagement with the recess of the second housing part. This makes it possible in a simple manner to fix the inlet part to the second housing part in a rotationally-fixed manner.

It is particularly advantageous if the end portion of the at least one holding arm is thermally deformable. This makes it possible to easily reshape the at least one holding arm through the application of heat after it has been inserted into the inlet channel from the side of the inlet channel pointing toward the associated pump chamber. For this purpose, the at least one holding arm may consist of a thermally deformable plastic material.

The at least one holding arm may be, for example, of rectilinear configuration before insertion into the inlet channel and after insertion into the inlet channel can be thermally deformed into a curved or angled shape.

For example, provision may be made that the end portion of the at least one holding arm pointing away from the inlet valve seat body, after insertion of the holding arm into the inlet channel, is thermally deformed radially outwardly such that the end portion after the thermal deformation is directed outward relative to the longitudinal axis of the inlet channel and engages behind the inlet channel on the side pointing away from the pump chamber.

It is favorable if the inlet part in its entirety forms a one-piece plastic molded part.

Preferably, the inlet part consists of a POM material (polyoxymethylene material).

The inlet closing body comprises an inlet valve plate and an inlet valve stem adjoining the inlet valve plate on its side pointing away from the pump chamber. The inlet valve plate can sealingly abut against the inlet valve seat of the inlet part, and the inlet valve stem is displaceably mounted on the guide member of the inlet part. Preferably, the inlet valve plate is materially bonded to the inlet valve stem.

The guide member is preferably of annular configuration.

It is advantageous if the inlet valve stem passes through the guide member and comprises a stem portion, which protrudes out of the guide member in the direction of the suction conduit and to which a spring holder is fixed, wherein an inlet valve spring is clamped between the spring holder and the guide member. By means of the inlet valve spring, which is supported on the spring holder on the one hand and on the guide member on the other hand, the inlet valve stem and with this also the inlet valve plate can be applied with a spring force, under the action of which the inlet valve plate is pressed against the inlet valve seat. In the event of a suction movement of the piston dipping into the pump chamber, the inlet valve plate can lift off from the inlet valve seat against the action of the inlet valve spring, thus allowing cleaning fluid to flow from the suction line into the pump chamber via the inlet valve. If the piston performs an oppositely directed compressive movement, the inlet valve plate is pressed by the inlet valve spring against the inlet valve seat such that the cleaning liquid cannot flow back into the suction conduit via the inlet valve.

In an advantageous embodiment of the invention, the guide member forms a stop, which delimits the movement of the inlet valve stem in the direction of the pump chamber and thus also the movement of the inlet valve plate in the direction of the pump chamber. When the inlet valve stem moves in the direction of the pump chamber, the spring holder fixed to the inlet valve stem increasingly approaches the guide member and finally comes into abutment against its stop, thus preventing further movement of the inlet valve stem in the direction of the pump chamber and thus preventing further lifting of the inlet valve plate from the inlet valve seat.

The subsequent description of a preferred embodiment of the invention serves in conjunction with the drawing for further explanation.

DETAILED DESCRIPTION OF THE INVENTION

Figure 1:
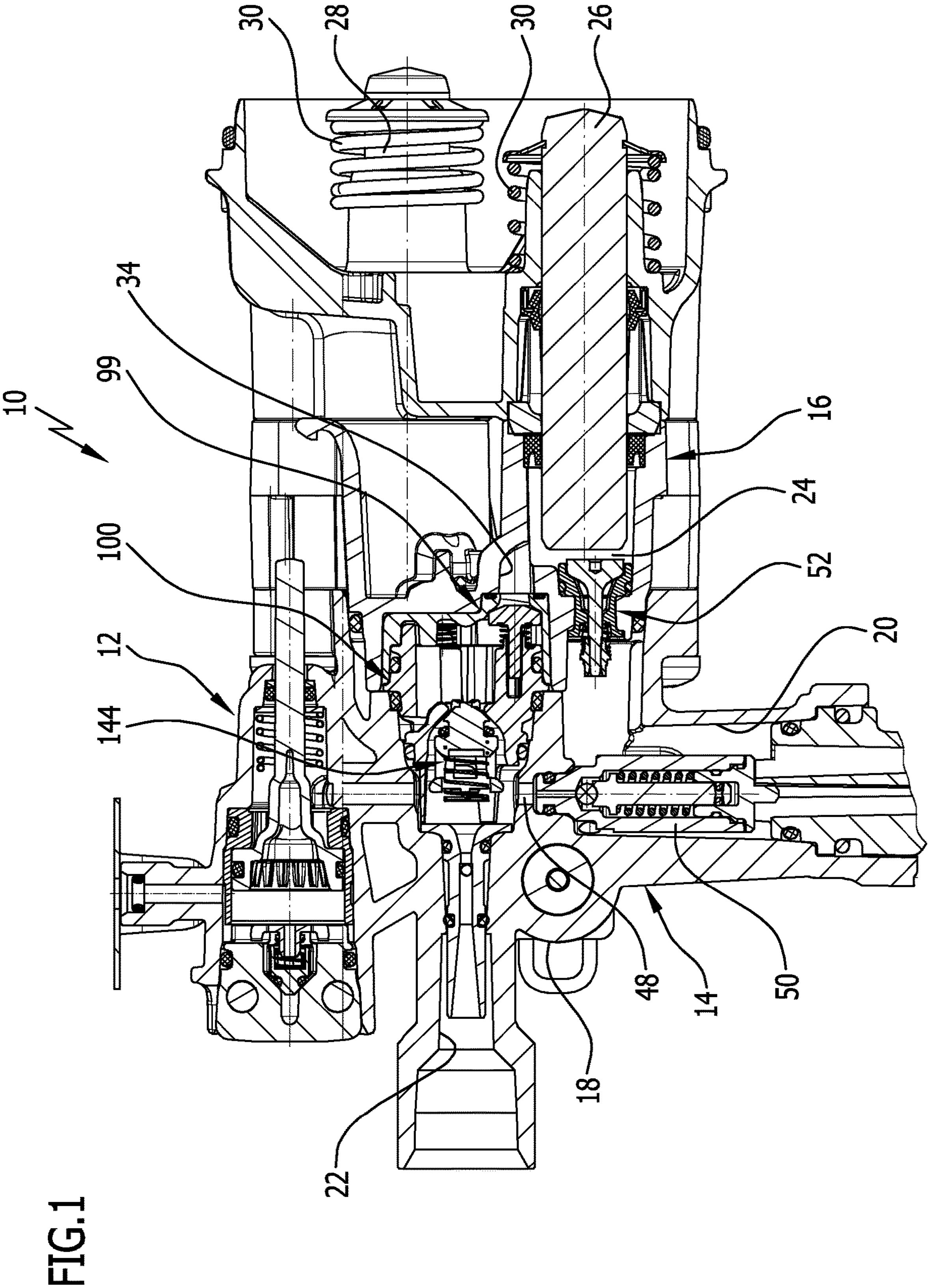
FIG. 1 shows a section view of a piston pump.

An advantageous embodiment of a piston pump, in accordance with the invention, for a high pressure cleaning device is schematically depicted in the drawing and is denoted as a whole with the reference numeral 10. A cleaning liquid, preferably water, can be conveyed by means of the piston pump 10. The piston pump 10 comprises a pump housing 12 with a first housing part 14 and a second housing part 16. The two housing parts 14, 16 are each configured as a metal part. In the depicted embodiment, they are each configured in the form of an aluminum die-cast part.

The first housing part 14 defines the front side 18 of the piston pump 10 and forms a suction conduit 20 and a pressure conduit 22. The second housing part 16 forms three pump chambers into each of which a piston dips. For a better overview, only one pump chamber 24 and two pistons 26, 28 are shown in the drawing. All pistons are pushed into the respective pump chamber 24 by a swash plate known per se, which is not shown in the drawing, and pushed back out of the pump chamber by a coil spring 30 surrounding the respective piston, such that the volume of the pump chambers 24 changes periodically.

Each pump chamber 24 is in flow connection with the suction conduit 20 by way of an inlet channel 32 of the second housing part 16. Each pump chamber 24 is in flow connection with the pressure conduit 22 by way of an outlet channel 34 of the second housing part 16. The inlet channels 32 are oriented in parallel to one another and each have a longitudinal axis 33.

Figure 2:
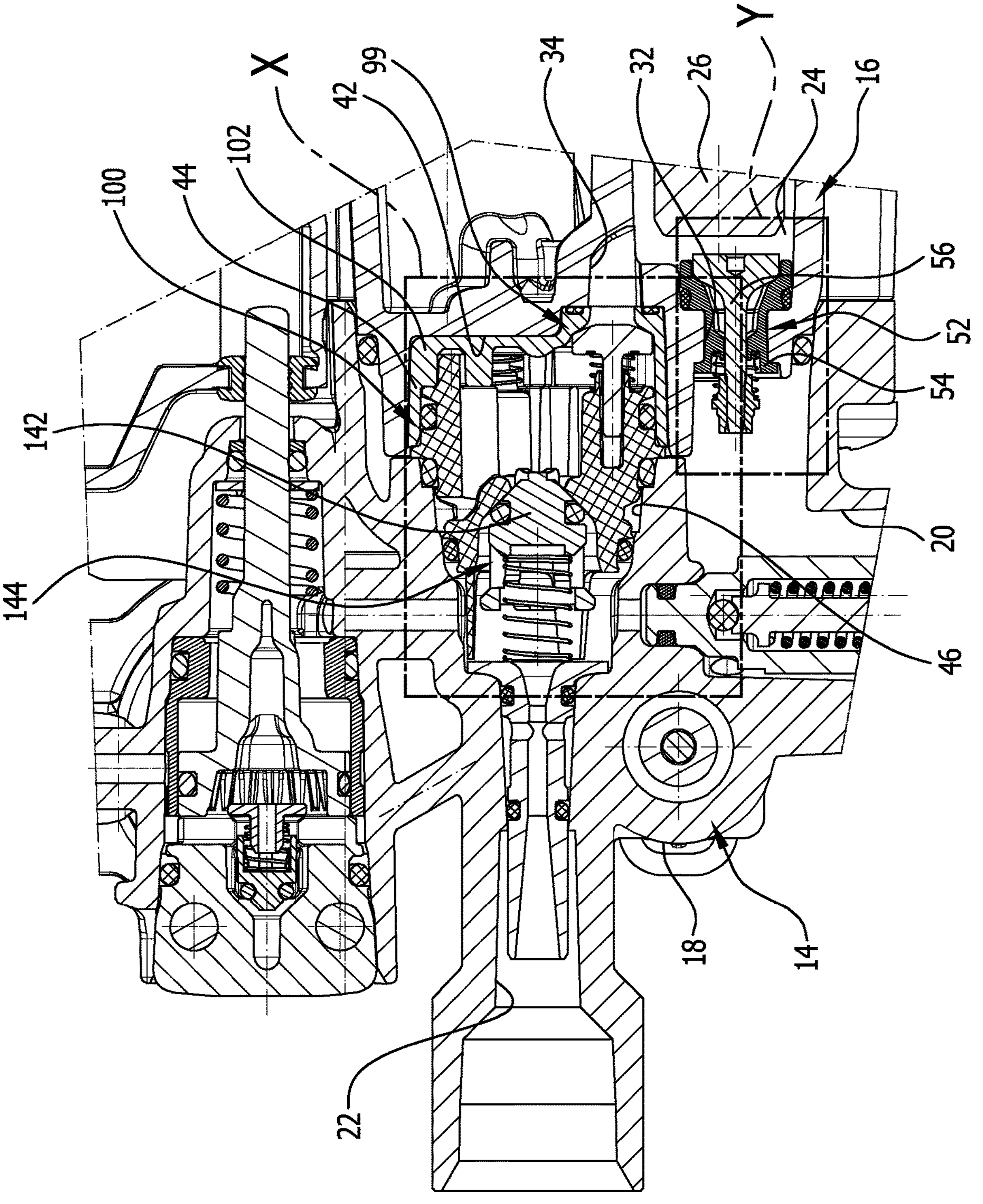
FIG. 2 shows an enlarged partial view of the piston pump from FIG. 1.
Figure 4:
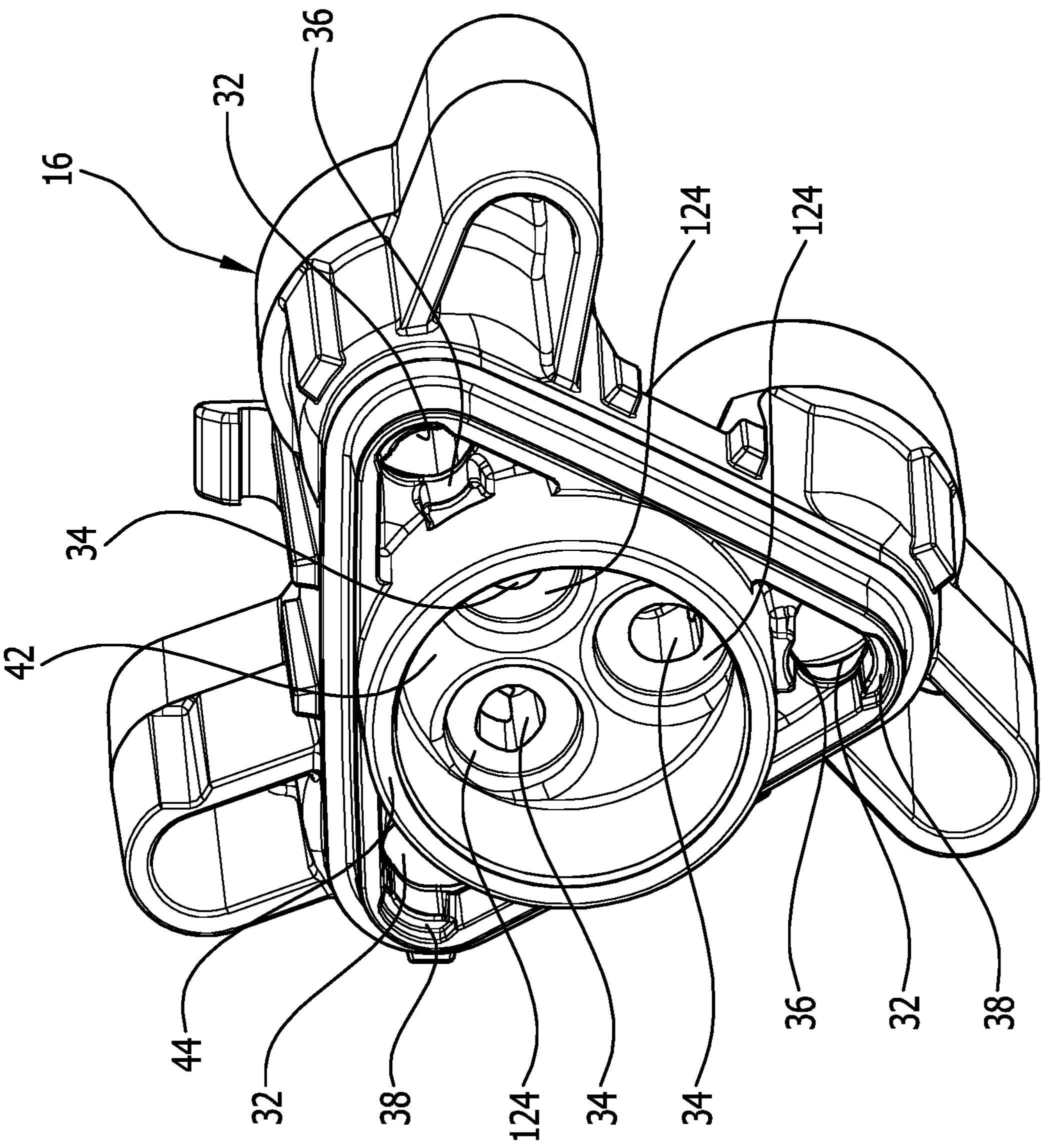
FIG. 4 shows a perspective depiction of a second housing part of the piston pump.
Figure 5:
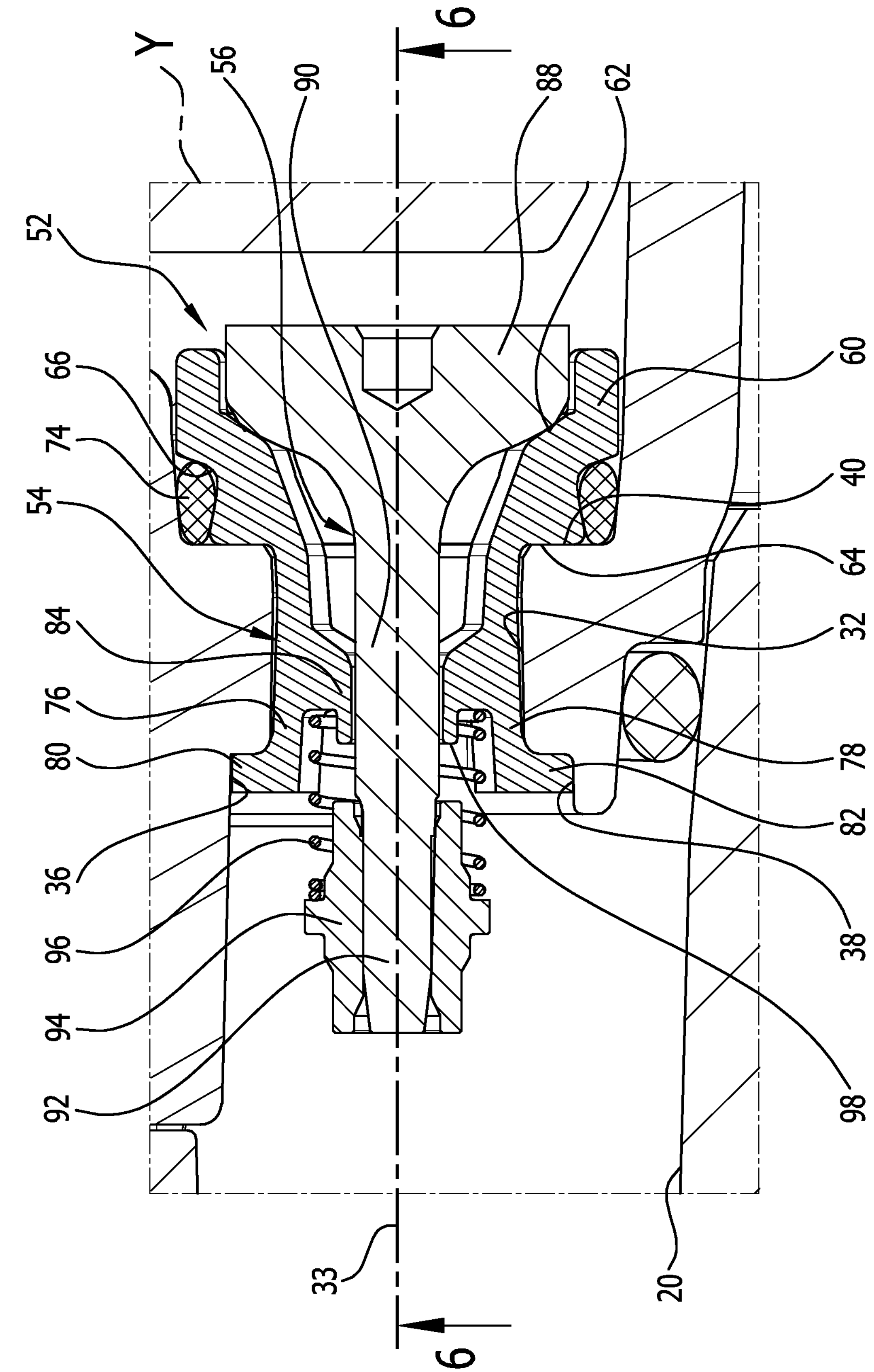
FIG. 5 shows an enlarged section view of detail Y from FIG. 2, which shows an inlet valve of the piston pump.
Figure 6:
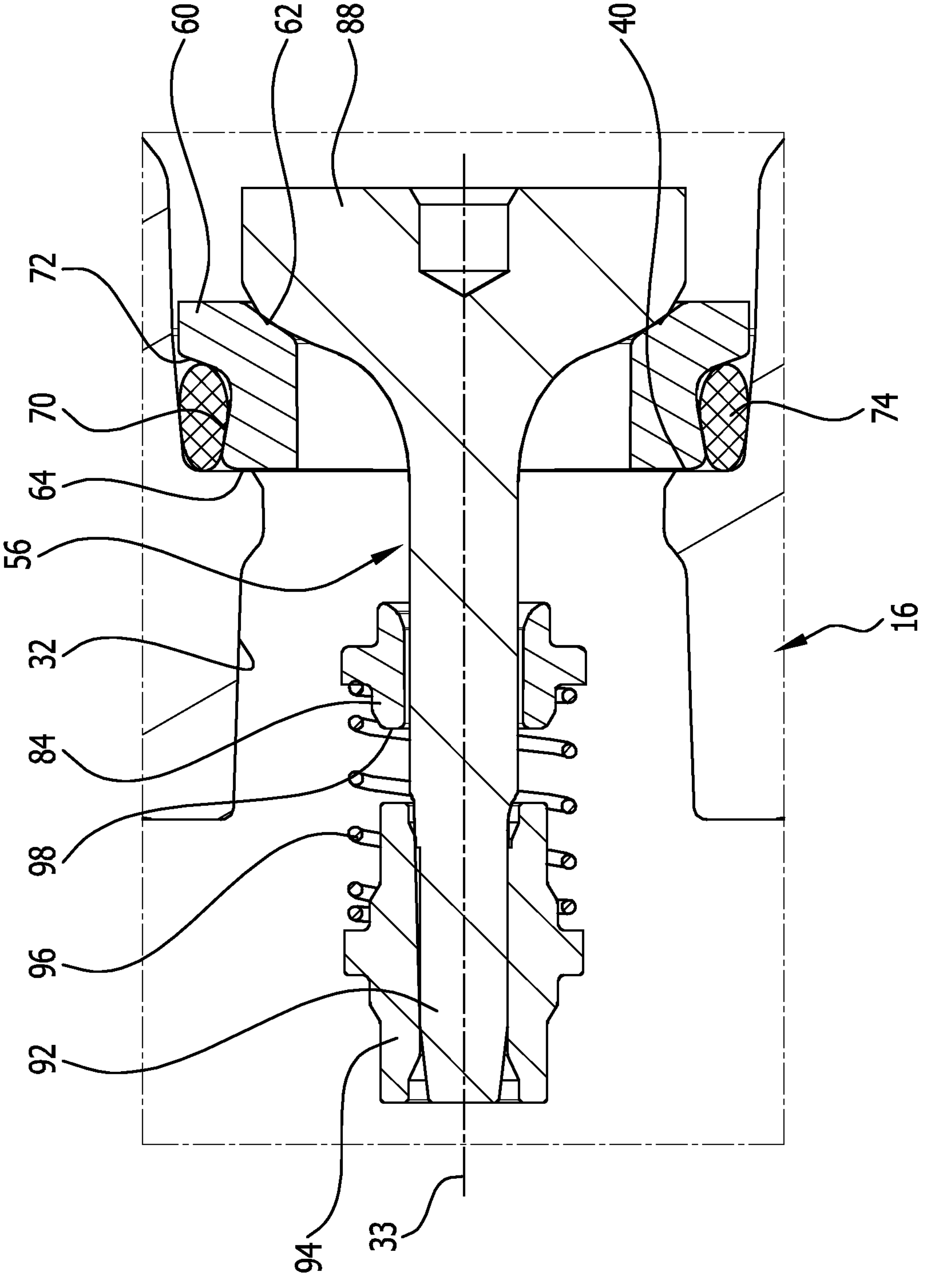
FIG. 6 shows a section view of the inlet valve from FIG. 5 along line 6-6.
Figure 8:
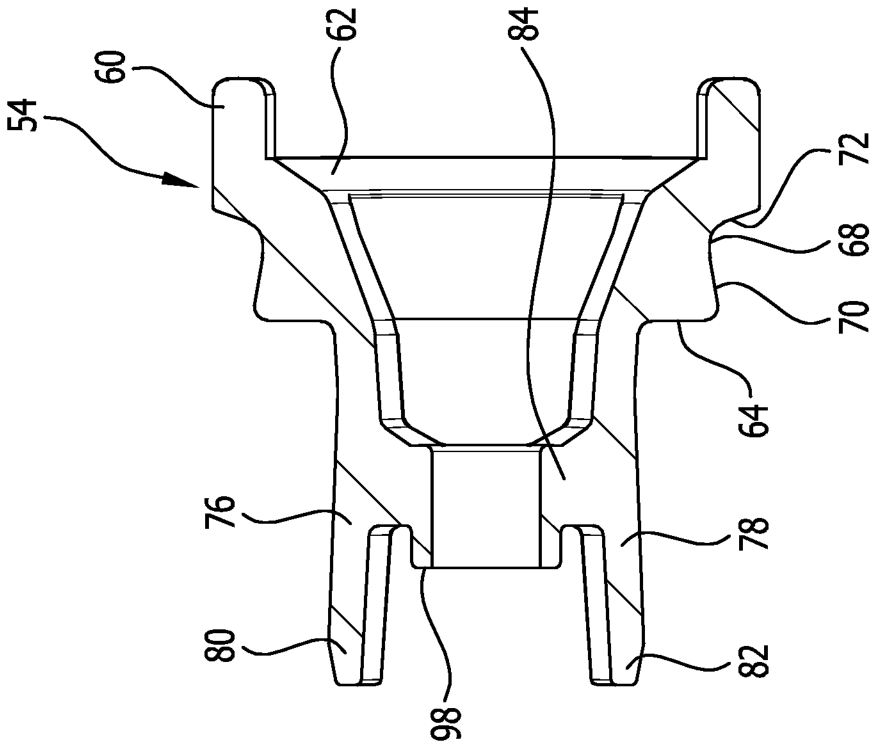
FIG. 8 shows a section view of the inlet part from FIG. 7.

Two diametrically opposed recesses 36, 38 of the second housing part 16 adjoin the inlet channels 32 on the side pointing toward the suction conduit 20. This is made clear in particular in FIG. 4. A respective annular support surface 40, which is formed by the second housing part 16 and faces toward the respective pump chamber 24, adjoins each of the inlet channels 34 in the direction of the pump chambers 24. This is clear in particular from FIGS. 2 and 5. The inlet support surfaces are oriented perpendicularly to the longitudinal axes 33.

Cleaning liquid to be pressurized can be sucked via the inlet channels 32 into the respective pump chamber 24, and the cleaning liquid can be dispensed via the outlet channels 34 from the pump chambers 24. The outlet channels 34 open into a central valve receptacle 42 of the second housing part 16, which is delimited in the circumferential direction by a cylinder wall 44. The valve receptacle 42 is arranged on the side of the second housing part 16 pointing toward the first housing part 14 and has a longitudinal axis 43 which is oriented in parallel to the longitudinal axes 33 of the inlet channels 32.

The first housing part 14 comprises a housing recess 46 on its side pointing toward the second housing part 16, which is oriented flush with the valve receptacle 42 of the second housing part 16 and which is adjoined by the pressure conduit 22 in the direction of the front side 18 of the first housing part 14.

From the housing recess 46 branches off a bypass conduit 48, which is formed from the first housing part 14 and in which a bypass valve 50 is arranged, which is known per se and therefore is only schematically depicted in the drawing. The bypass conduit 48 establishes a flow connection between the housing recess 46 and the suction conduit 20 and can be closed by means of the bypass valve 50.

The inlet channels 32 can each be closed by a respective inlet valve 52. The inlet valves 52 are of identical configuration and each comprise an inlet part 54, which consists of a plastic material, preferably of a POM material, and which is inserted into an inlet channel 32. In addition, the inlet valves 52 each comprise an inlet closing body 56, which is reciprocally movable relative to the inlet part 54 in the axial direction.

The inlet part 54 comprises an inlet valve seat body 60, which forms an inlet valve seat 62 of the respective inlet valve 52. The inlet valve seat body 60 protrudes into the respectively associated pump chamber 24 and is supported with an abutment surface 64 facing away from the respective pump chamber 24 on the inlet support surface 40 adjoining the respective inlet channel 32 in the direction of the pump chamber 24.

Figure 7:
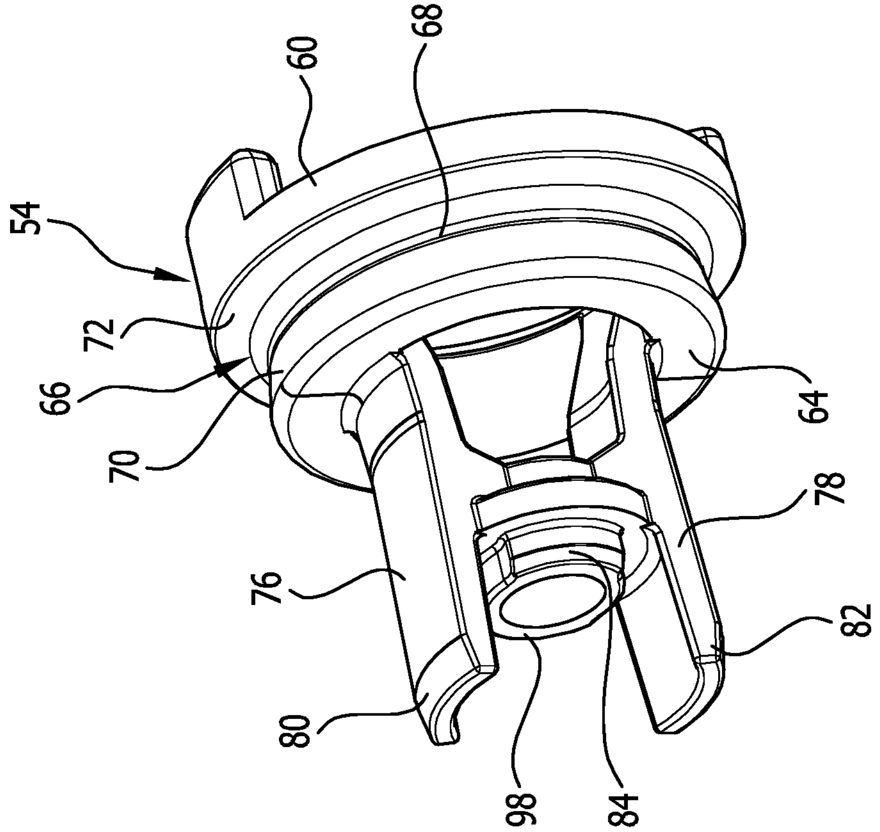
FIG. 7 shows a perspective depiction of an inlet part of the inlet valve from FIG. 5 before the assembly thereof.
Figure 10:
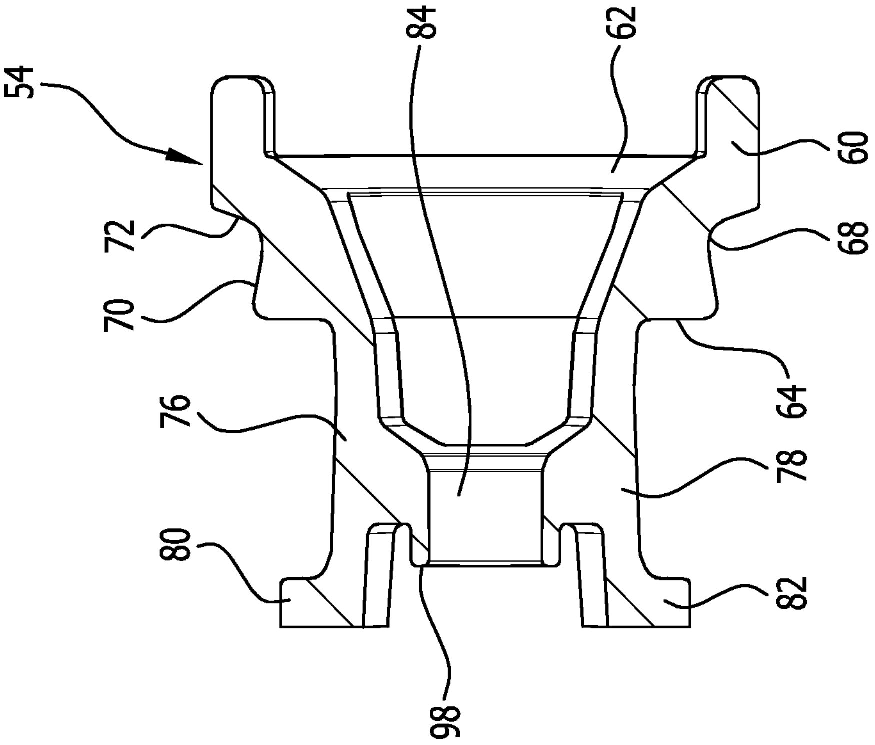
FIG. 10 shows a section view of the inlet part from FIG. 9.
Figure 9:
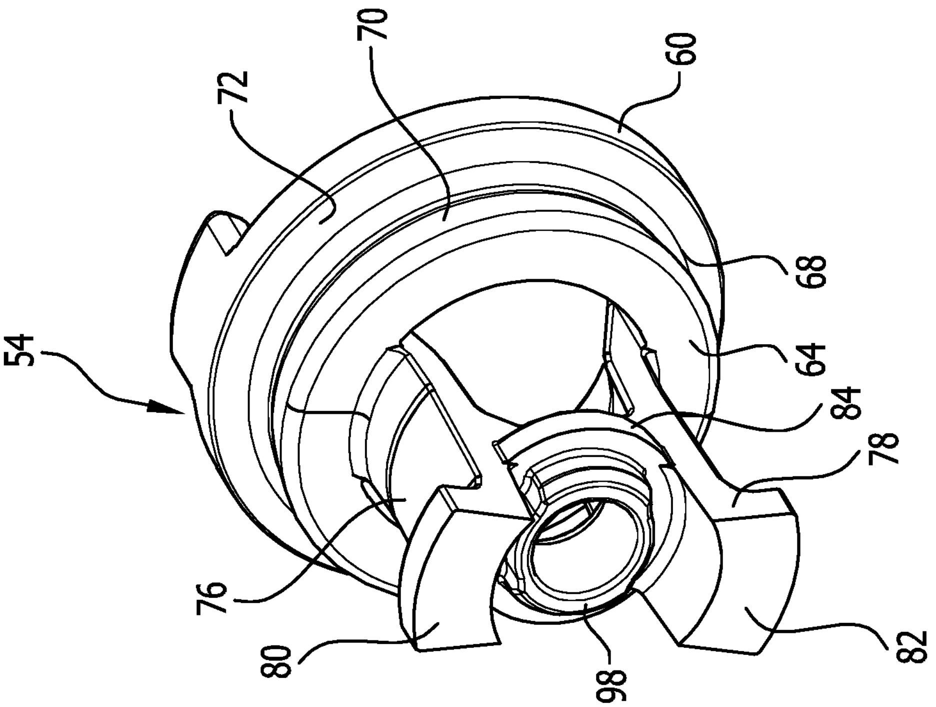
FIG. 9 shows a perspective depiction of the inlet part of the inlet valve after the assembly thereof.

The abutment surface 64 is adjoined by a sealing ring receptacle 66 in the form of an annular groove 68, which extends over the circumference of the inlet valve seat body 60 and comprises a first groove wall 70 directly adjoining the abutment surface 64 and a second groove wall 72 adjoining said first groove wall 70. The outer diameter of the inlet valve seat body 60 continuously decreases over the first groove wall 70 with increasing distance from the abutment surface 64. The outer diameter of the inlet valve seat body 60 increases continuously over the second groove wall 72 with increasing distance from the abutment surface 64. This is clear, in particular, in FIGS. 7 and 9.

The sealing ring receptacle 66 accommodates a first sealing ring 74, which seals off the inlet valve seat body 60 in the axial direction relative to the inlet support surface 40.

The inlet valve seat body 60 of the inlet part 54 is adjoined in the direction of the suction conduit 20 by two diametrically opposed holding arms 76, 78 with respect to the longitudinal axis 33 of the inlet channel 32, which pass through the inlet channel 34 and each comprise an end portion 80, 82 pointing away from the inlet valve seat body 60, which protrudes out of the inlet channel 32 on the side of the inlet channel 32 pointing away from the pump chamber 24 and, in the assembled state of the inlet valve 52, engages behind the respective inlet channel 32 by dipping into a recess 36, 38 of the second housing part 16 and forming a positive engagement therewith. This is described in more detail below.

The holding arms 76, 78 accommodate an annular guide member 84 between them in the region of the inlet channel 32. The outer diameter of the guide member 84 is smaller than the diameter of the inlet channel 32. This allows the cleaning fluid to flow around the guide member 84 within the inlet channel 32.

The guide member 84 is materially bonded to the holding arms 76, 78, and the holding arms 76, 78 are materially bonded to the inlet valve seat body 60.

In the depicted embodiment, the inlet part 54 forms a one-piece plastic molded part, which defines the inlet valve seat body 60, the holding arms 76, 78, and the guide member 84.

The inlet closing body 56 comprises an inlet valve plate 88 and an inlet valve stem 90, which adjoins said inlet valve plate 88 in one piece on the side of the inlet valve plate 88 pointing away from the pump chamber 24. The inlet valve plate 88 can sealingly abut against the inlet valve seat 62 of the inlet valve seat body 60, and the inlet valve stem 90 extends through the guide member 84 in the direction toward the section conduit 20.

A spring holder 94 is fixed to a stem portion 92 of the inlet valve stem 90 that protrudes out of the guide member 84 in the direction of the suction conduit 20. An inlet valve spring 96 is clamped between the spring holder 94 and the guide member 84. The inlet valve spring 96 is configured as a coil spring, which is supported on the spring holder 94 on the one hand and on the guide member 84 on the other hand, and surrounds the inlet valve stem 90 in the circumferential direction in the region between the guide member 94 and the spring holder 94. Under the action of the inlet valve spring 96, the inlet valve plate 88 connected to the inlet valve stem 90 in one piece is pressed against the inlet valve seat 62 of the inlet valve seat body 60, such that the inlet valve 52 adopts its closing position.

When the piston 26, 28 dipping into the respective pump chamber 24 moves in the direction pointing away from the inlet channel 32, the inlet valve 52 thus opens by the inlet valve plate 88 lifting off from the inlet valve seat 62 against the spring force of the inlet valve spring 96 and thereby unblocking a flow connection from the suction conduit 20 to the pump chamber 24, such that cleaning liquid is able to flow from the suction conduit 20 via the inlet channel 32 into the pump chamber 24. The cleaning fluid can hereby flow around the spring holder 94, the inlet valve spring 96, and the guide member 84 on the outside, such that flow losses can be kept to a minimum.

The inlet valve plate 88 can lift off from the inlet valve seat 62 so far that the spring holder 94 comes into abutment against a stop 98 of the guide member 84 configured as a projection or a sleeve. The stop 98 thus delimits the lifting movement of the inlet valve plate 96.

When the piston 26, 28 moves in the direction of the inlet channel 32, the inlet valve plate 88 thus adopts its position on the inlet valve seat, such that the cleaning liquid cannot flow back into the suction conduit 20.

For the assembly of the inlet valve 52, in a first assembly step, the inlet part 54 can be inserted with initially rectilinear aligned holding arms 76, 78, as they are depicted in FIGS.

7 and 8, from the side pointing toward the pump chamber 24 into the inlet channel 32, such that the abutment surface 64 comes into abutment against the inlet support surface 40 and the end portions 80, 82 of the holding arms 76, 78 protrude out of the inlet channel 32 on the side of the inlet channel 32 pointing away from the pump chamber 24. The end portions 80, 82 can then be formally reshaped, the end portions 80, 82 being pushed radially outwardly and dipping into the recesses 36, 38 and with them in each case forming a positive engagement. As a result, the inlet part 54 is axially immovable and held on the inlet channel 32 in a rotationally-fixed manner. In a further assembly step, the inlet closing body 56 can then be mounted on the inlet part 54 by inserting the inlet valve stem 90 from the side pointing toward the pump chamber 24 into the inlet part 54, wherein the inlet valve stem 90 passes through the guide member 84. The inlet valve spring 96 can then be placed on the stem portion 92 protruding out of the guide member 84 on the side pointing away from the pump chamber 24, and then the spring holder 94 can be fixed to the stem portion 92. The fixing of the spring holder 94 to the stem portion 92 may be effected, for example, by means of ultrasonic welding.

The outlet channels 34 opening into the valve receptacle can each be closed by a respective outlet valve 99. The outlet valves 99 are of identical configuration and are formed by an outlet valve assembly 100 that can be pre-assembled and that is accommodated by the valve receptacle 42 of the second housing part 16 and the housing recess 46 of the first housing part 14.

Figure 3:
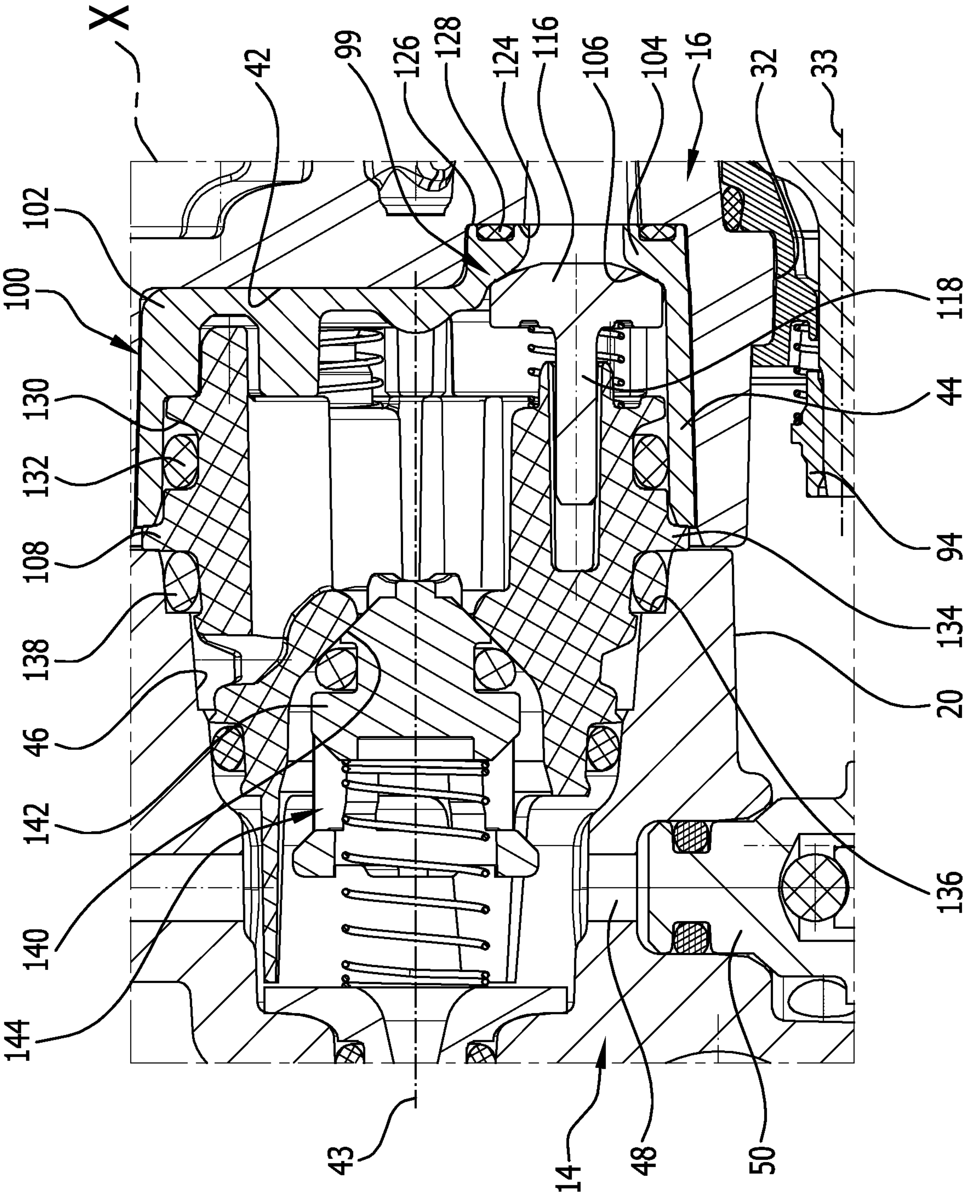
FIG. 3 shows an enlarged section view of detail X from FIG. 2, which shows an outlet valve assembly of the piston pump.
Figure 11:
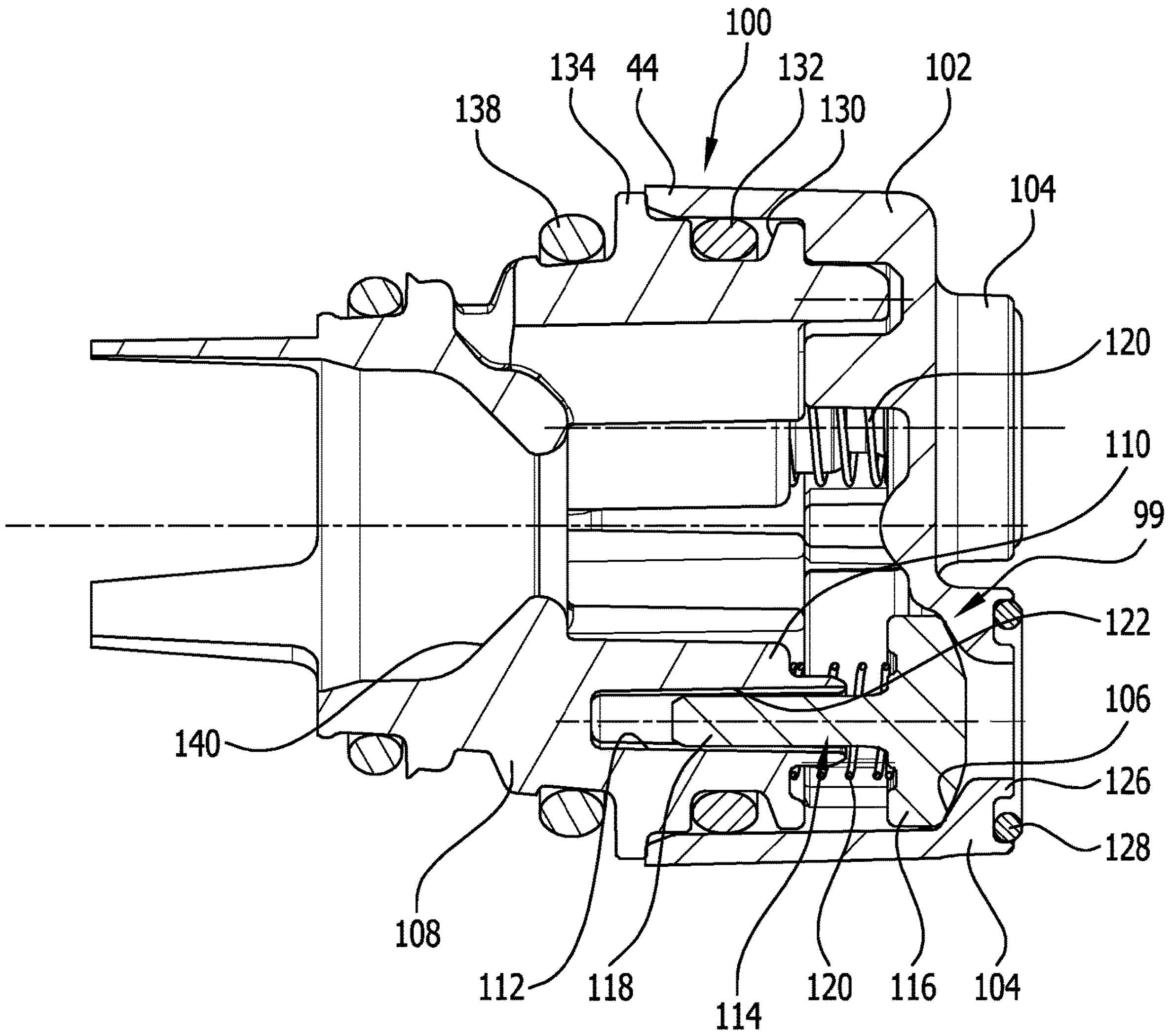
FIG. 11 shows a section view of the outlet valve assembly from FIG. 3.

The outlet valve assembly 100 is shown enlarged in FIGS. 3 and 11. It comprises an outlet part 102, which consists of a plastic material, for example of a POM material. The outlet part 102 is inserted into the valve receptacle 52 and comprises a plurality of annular outlet valve seat bodies 104, each forming an outlet valve seat 106 of an outlet valve 99.

In addition to the outlet part 102, the outlet valve assembly 100 comprises a guide body 108, which also consists of a plastic material, for example of a fiber-reinforced plastic material, and which is connectable to the outlet part 102 in a releasable and liquid-tight manner. The guide body 108 forms guide elements 110 in the form of guide receptacles 112, which are oriented flush with an . . . ; outlet valve seat 106.

The outlet part 102 and the guide body 108 accommodate between them a plurality of outlet closing bodies 114, which are reciprocally displaceable relative to the outlet part 54 and to the guide body 108 and each comprise an outlet valve plate 116 and an outlet valve stem 118 of an outlet valve 99 adjoining said outlet valve plate 116 in one piece. The outlet valve plate 116 can sealingly abut against an outlet valve sat 106, and the outlet valve stem 118 adjoining the outlet valve plate 116 on the side thereof pointing away from the outlet valve seat 106 dips into a guide receptacle 112, in which it is displaceably mounted.

Clamped between the guide receptacles 112 and the outlet valve plates 116 is a respective outlet valve spring 120 of an outlet valve 99, which is supported on a guide receptacle 112 on the one hand and on an outlet valve plate 116 on the other hand and surrounds an outlet valve stem 118 in the circumferential direction in the region between the outlet valve plate 116 and the guide receptacle 112. This is made clear in particular in FIG. 11.

An inner groove 122 extending in the longitudinal direction of the guide receptacle 112 is molded into the guide receptacle 112, via which inner groove 122 cleaning liquid can escape from the guide receptacle 112.

In the region of the valve receptacle 42, the second housing part 16 forms annular outlet support surfaces 124, which each adjoin an outlet channel 34 in the direction of the valve receptacle 42 and are oriented perpendicularly to the longitudinal axis 43 of the valve receptacle 42. The outlet valve seat bodies 114 are each supported with their end face 126 pointing away from the respective outlet valve seat 106 on an outlet support surface 124, wherein arranged between the end faces 126 and the outlet support surfaces 124 is a respective second sealing ring 128, which seals off the respective outlet valve seat body 104 in the axial direction relative to the second housing part 16.

The guide body 108 is surrounded in the circumferential direction by an annular groove 130, in which a third sealing ring 132 is arranged. The third sealing ring 132 ensures the liquid-tight connection between the outlet part 102 and the guide body 108.

The annular groove 130 is adjoined in the direction of the housing recess 46 by an annular projection 134 extending over the outer circumference of the guide body 108. At a distance from the annular projection 134, the housing recess 46 forms a radially inwardly directed step 136. A fourth sealing ring 138 is positioned between the annular projection 134 and the step 136, which seals off the guide body 108 in the axial direction relative to the first housing part 14.

In its region dipping into the housing recess 46, the guide body 108 forms a check valve seat 140 pointing away from the outlet part 102, against which seat a check valve closing body 142 can sealingly abut. In combination with the check valve closing body 142, the check valve seat 140 forms a central check valve 144.

The outlet valve assembly 100 is configured as a unit that can be preassembled and can be inserted into the valve receptacle 42 and the housing recess 46 during the assembly of the piston pump 10. Since the outlet valve assembly 100 forms all outlet valves 99, this makes the assembly of the piston pump 10 easier.

As already mentioned, the two housing parts 14 and 16 are configured as metal parts. Here, the provision of the inlet valves 52 and the outlet valves 99 requires no post-processing of the metal parts, because the inlet parts 54 and the outlet part 102 are inserted in the form of plastic components into the metal parts and provide the valve seats. The piston pump 10 can therefore be produced cost-effectively.

In addition, the piston pump 10 is characterized by good suction characteristics, since the volume of the pump chambers 24 that cannot be displaced by the pistons 26, 28 of the piston pump 10 can be kept low.

The invention claimed is:

1. A piston pump for a high pressure cleaning device for conveying a cleaning liquid, having a pump housing, which comprises a first housing part and a second housing part that are each configured as a metal part, wherein the first housing part forms a suction conduit and a pressure conduit, and wherein the second housing part forms a plurality of pump chambers into each of which a reciprocally movable piston dips and which are each in flow connection with the suction conduit by way of an inlet channel and with the pressure conduit by way of an outlet channel, wherein the inlet channels are each closable by an inlet valve and the outlet channels are each closable by an outlet valve, wherein the outlet valves each comprise a stationarily held outlet valve seat and an outlet closing body that is reciprocally displaceable relative to the outlet valve seat and that comprises an outlet valve plate that can sealingly abut against an outlet valve seat, wherein the second housing part comprises a valve receptacle into which the outlet channels open, and wherein the piston pump comprises an outlet valve assembly, which forms all outlet valves, wherein the outlet valve assembly comprises an outlet part, which consists of a plastic material and is inserted into the valve receptacle and forms all outlet valve seats.

2. The piston pump in accordance with claim 1, wherein the outlet valve assembly is configured as a unit that can be preassembled.

3. The piston pump in accordance with claim 1, wherein the outlet part comprises a plurality of annular outlet valve seat bodies, which each form an outlet valve seat.

4. The piston pump in accordance with claim 3, wherein the second housing part in a region of the valve receptacle forms a plurality of annular outlet support surfaces, which are oriented perpendicularly to a longitudinal axis of the valve receptacle and each adjoin an outlet channel in the flow direction of the cleaning liquid and on each of which a respective outlet valve seat body abuts with the interposition of a sealing ring.

5. The piston pump in accordance with claim 1, wherein the outlet closing bodies each comprise an outlet valve stem that adjoins the outlet valve plate in a direction pointing away from the outlet channel.

6. The piston pump in accordance with claim 5, wherein the outlet valve assembly comprises a guide body, which consists of a plastic material and comprises a plurality of guide elements on each of which an outlet valve stem is displaceably mounted.

7. The piston pump in accordance with claim 6, wherein the guide elements each form a guide receptacle into which an outlet valve stem dips.

8. The piston pump in accordance with claim 7, wherein the guide receptacles each comprise at least one inner groove extending in the longitudinal direction of the guide receptacles.

9. The piston pump in accordance with claim 6, wherein a respective outlet valve spring is clamped between the guide elements and the outlet valve plates.

10. The piston pump in accordance with claim 6, wherein the guide body is connectable to the outlet part in a releasable and liquid-tight manner.

11. The piston pump in accordance with claim 6, wherein the guide body forms a check valve seat for a central check valve arranged downstream of the outlet valves relative to the flow direction of the cleaning liquid.

12. The piston pump in accordance with claim 6, wherein the first housing part comprises a housing recess oriented flush with the valve receptacle, into which the guide body dips with the interposition of at least one sealing ring.

13. The piston pump in accordance with claim 12, wherein the at least one sealing ring surrounds the guide body in the circumferential direction.

14. The piston pump in accordance with claim 12, wherein the guide body comprises an outwardly protruding annular projection, with which a radially inwardly directed step of the housing recess of the first housing part is associated, wherein a sealing ring is arranged between the projection and the step.

15. The piston pump in accordance with claim 1, wherein the inlet valves each comprise an inlet part inserted into an inlet channel and an inlet closing body that is reciprocally displaceable relative to the inlet part, wherein the inlet part comprises an inlet valve seat and a guide member arranged offset to the inlet valve seat, and wherein the inlet closing body comprises an inlet valve plate that can sealingly abut against the inlet valve seat and an inlet valve stem that adjoins the inlet valve plate and is displaceably mounted on the guide member, wherein the inlet part consists of a plastic material and comprises an annular inlet valve seat body that faces toward the pump chamber and forms the inlet valve seat, and wherein the guide member is arranged upstream of the inlet valve seat relative to the flow direction of the cleaning liquid.

16. The piston pump in accordance with claim 15, wherein the inlet valve seat body protrudes out of the inlet channel in the direction of the pump chamber.

17. The piston pump in accordance with claim 16, wherein the second housing part forms an annular inlet support surface that adjoins the inlet channel in a direction of the pump chamber and is oriented perpendicularly to a longitudinal axis of the inlet channel and against which the inlet valve seat body abuts with an abutment surface.

18. The piston pump in accordance with claim 17, wherein the inlet valve seat body comprises a sealing ring receptacle, which adjoins the abutment surface and in which a sealing ring that seals off the inlet valve seat body relative to the inlet support surface is arranged.

19. The piston pump in accordance with claim 18, wherein the sealing ring receptacle forms an annular groove surrounding the inlet valve seat body in the circumferential direction, with a first groove wall adjoining the abutment surface, over which the outer diameter of the inlet valve seat body continuously decreases with increasing distance from the abutment surface and which is adjoined by a second groove wall.

20. The piston pump in accordance with claim 19, wherein the outer diameter of the inlet valve seat body continuously increases over the second groove wall with increasing distance from the abutment surface.

21. The piston pump in accordance with claim 15, wherein the inlet part comprises at least one holding arm, which adjoins the inlet valve seat body in a direction of the suction conduit and is held in a rotationally-fixed manner relative to the inlet channel.

22. The piston pump in accordance with claim 21, wherein the at least one holding arm engages behind the inlet channel on its side pointing toward the suction conduit.

23. The piston pump in accordance with claim 21, wherein the at least one holding arm is materially bonded to the inlet valve seat body.

24. The piston pump in accordance with claim 21, wherein the inlet part comprises two diametrically opposed holding arms with respect to a longitudinal axis of the inlet channel.

25. The piston pump in accordance with claim 21, wherein the guide member is fixed to the at least one holding arm.

26. The piston pump in accordance with claim 21, wherein the guide member is materially bonded to the at least one holding arm.

27. The piston pump in accordance with claim 21, wherein the at least one holding arm comprises an end portion, which points away from the inlet valve seat body and dips into a recess of the second housing part.

28. The piston pump in accordance with claim 27, wherein the end portion of the at least one holding arm forms a positive engagement with the recess.

29. The piston pump in accordance with claim 27, wherein the end portion of the at least one holding arm is thermally deformable.

30. The piston pump in accordance with claim 15, wherein the inlet part forms a one-piece plastic molded part.

31. The piston pump in accordance with claim 15, wherein the inlet valve stem passes through the guide member and comprises a stem portion, which protrudes out of the guide member in a direction of the suction conduit and to which a spring holder is fixed, wherein an inlet valve spring is clamped between the spring holder and the guide member.

32. The piston pump in accordance with claim 31, wherein the guide member forms a stop, which delimits movement of the inlet valve plate in a direction of the pump chamber.

* * * * *